US011127145B2

(12) United States Patent
Ely

(10) Patent No.: US 11,127,145 B2
(45) Date of Patent: Sep. 21, 2021

(54) IMAGE REGISTRATION TO A 3D POINT SET

(71) Applicant: Raytheon Company, Waltham, MA (US)

(72) Inventor: Richard W. Ely, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/507,798

(22) Filed: Jul. 10, 2019

(65) Prior Publication Data

US 2020/0020115 A1 Jan. 16, 2020

Related U.S. Application Data

(60) Provisional application No. 62/696,107, filed on Jul. 10, 2018, provisional application No. 62/696,118, filed on Jul. 10, 2018.

(51) Int. Cl.
*G06T 7/32* (2017.01)
*G06T 7/136* (2017.01)
*G06T 7/13* (2017.01)
*G06T 7/33* (2017.01)
(Continued)

(52) U.S. Cl.
CPC .............. *G06T 7/32* (2017.01); *G06T 3/0068* (2013.01); *G06T 3/20* (2013.01); *G06T 7/13* (2017.01); *G06T 7/136* (2017.01); *G06T 7/33* (2017.01); *G06T 2207/10028* (2013.01);
(Continued)

(58) Field of Classification Search
CPC .. G06T 7/32; G06T 7/136; G06T 7/13; G06T 7/33; G06T 3/0068; G06T 3/20; G06T 2207/10028; G06T 2207/10032; G06T 2207/20016; G06T 2207/20221
See application file for complete search history.

(56) References Cited

U.S. PATENT DOCUMENTS

| 5,552,787 | A | 9/1996 | Schuler et al. |
| 8,239,175 | B2 * | 8/2012 | Wivell ................ G06T 17/05 703/2 |
| 9,165,361 | B1 | 10/2015 | Ely |

(Continued)

FOREIGN PATENT DOCUMENTS

EP 2687817 1/2014
WO WO-2020014341 A1 1/2020
(Continued)

OTHER PUBLICATIONS

Fisher et al ("Sobel Edge Detector", 2017, https://homepages.inf.ed.ac.uk/rbf/HIPR2/sobel.htm) (Year: 2017).*
(Continued)

*Primary Examiner* — Xin Sheng
(74) *Attorney, Agent, or Firm* — Schwegman Lundberg & Woessner, P.A.

(57) ABSTRACT

Discussed herein are devices, systems, and methods for image processing. A method can include generating a synthetic image based on a two-dimensional (2D) image of the geographical region, performing a coarse registration to grossly, register the synthetic image to the 2D image, and performing a fine registration following the coarse registration to improve the registration between the synthetic image and the 2D image.

16 Claims, 7 Drawing Sheets

(51) Int. Cl.
*G06T 3/00* (2006.01)
*G06T 3/20* (2006.01)

(52) U.S. Cl.
CPC .............. *G06T 2207/10032* (2013.01); *G06T 2207/20016* (2013.01); *G06T 2207/20221* (2013.01)

(56) References Cited

U.S. PATENT DOCUMENTS

| | | | |
|---|---|---|---|
| 9,245,201 B1* | 1/2016 | Jin | G06K 9/6215 |
| 9,269,145 B2 | 2/2016 | Ely et al. | |
| 9,275,267 B2 | 3/2016 | Verret | |
| 2005/0220363 A1 | 10/2005 | Oldroyd | |
| 2006/0215935 A1 | 9/2006 | Oldroyd | |
| 2008/0103699 A1 | 5/2008 | Hanna et al. | |
| 2008/0147325 A1 | 6/2008 | Maassel et al. | |
| 2012/0274505 A1 | 11/2012 | Pritt et al. | |
| 2014/0112536 A1* | 4/2014 | Ely | G06T 7/32 382/103 |
| 2015/0172626 A1* | 6/2015 | Martini | G06K 9/46 348/50 |
| 2015/0371431 A1 | 12/2015 | Korb et al. | |
| 2016/0321820 A1 | 11/2016 | Ely | |
| 2017/0069092 A1* | 3/2017 | Bell | G06K 9/00201 |
| 2017/0116723 A1 | 4/2017 | Aughey | |
| 2018/0304468 A1* | 10/2018 | Holz | G06T 17/05 |
| 2020/0020072 A1 | 1/2020 | Ely | |
| 2020/0020116 A1 | 1/2020 | Ely | |

FOREIGN PATENT DOCUMENTS

| | | | |
|---|---|---|---|
| WO | WO-2020014343 A1 | 1/2020 | |
| WO | WO-2020014347 A1 | 1/2020 | |

OTHER PUBLICATIONS

Jiang, Jiayan, et al. "Learning based coarse-to-fine image registration." 2008 IEEE Conference on Computer Vision and Pattern Recognition. IEEE, 2008. (Year: 2008).*
Wiki ("Contrast (Vision)", 2017, https://en.wikipedia.org/wiki/Contrast_(vision)) (Year: 2017).*
U.S. Appl. No. 16/507,814, filed Jul. 10, 2019, Synthetic Image Generation From 3D-Point Cloud.
U.S. Appl. No. 16/364,969, filed Mar. 26, 2019, Multi-Source Image Fusion.
"U.S. Appl. No. 16/364,969, Examiner Interview Summary dated Jun. 15, 2020", 3 pgs.
"U.S. Appl. No. 16/364,969, Non Final Office Action dated Apr. 1, 2020", 21 pgs.
"U.S. Appl. No. 16/364,969, Response filed Jun. 26, 2020 to Non Final Office Action dated Apr. 1, 2020", 8 pgs.
Hirschmugl, Manuela, et al., "Integrative use of SAR and optical data for forest mapping in the Congo basin", Proceedings of the International Conference of the African Association of Remote Sensing and the Environment (AARSE), pp. 1-8, (2012), 11 pgs.
"International Application Serial No. PCT US2019 041185, International Search Report dated Sep. 27, 2019", 5 pgs.
"International Application Serial No. PCT US2019 041185, Written Opinion dated Sep. 27, 2019", 7 pgs.
"Image registration [Harris Geospatial Docs Center]", https: web.archive.org web 20171013044442 https: www.harrisgeospati al.com docs ImageRegi strati on.html.
"International Application Serial No. PCT US2019 041176, International Search Report dated Sep. 27, 2019", 5 pgs.
"International Application Serial No. PCT US2019 041176, Written Opinion dated Sep. 27, 2019", 7 pgs.
"International Application Serial No. PCT US2019 041180, International Search Report dated Sep. 27, 2019", 4 pgs.
"International Application Serial No. PCT US2019 041180, Written Opinion dated Sep. 27, 2019", 6 pgs.
Compton, J Tucker, "NASA's Global Orthorectified Landsat Data Set", Photogrammetric Engineering and Remote Sensing, vol. 70, No. 3, (Mar. 1, 2004), 313-322.
Jong-Il, Park, "Hierarchical depth mapping from multiple cameras", In: Serious Games, (Jan. 1, 1997), 685-692.
Oliver, Schreer, "3D Video communication: Algorithms, concepts and real-time systems in human centred communication", In: 3D videocommunication : algorithms, concepts and real-time systems in human centred communication, (Sep. 1, 2005), 119-120.
"U.S. Appl. No. 16/364,969, Advisory Action dated Oct. 26, 2020", 2 pgs.
"U.S. Appl. No. 16/364,969, Examiner Interview Summary dated Oct. 7, 2020", 3 pgs.
"U.S. Appl. No. 16/364,969, Final Office Action dated Jul. 30, 2020", 18 pgs.
"U.S. Appl. No. 16/364,969, Response filed Oct. 16, 2020 to Final Office Action dated Jul. 30, 2020", 8 pgs.
"U.S. Appl. No. 16/507,814, Examiner Interview Summary dated Oct. 22, 2020", 3 pgs.
"U.S. Appl. No. 16/507,814, Non Final Office Action dated Aug. 13, 2020", 20 pgs.
Dowdeswell, J A, et al., "Digital mapping in Polar regions from Landsat photographic products: a case study", Annals of glaciology 8, (1986), 47-50.
Harris, "View Metadata", [Online]. Retrieved from the Internet: <https://www.harrisgeospatial.com/docs/ViewFileMetadata.html.>, (2017).

* cited by examiner

IMAGE REGISTRATION TO A 3D POINT SET

RELATED APPLICATIONS

This application claims the benefit of priority to U.S. Provisional Patent Application Ser. No. 62/696,107, filed on Jul. 10, 2018, and titled "Image Registration to a 3D Point Set" and U.S. Provisional Patent Application Ser. No. 62/696,118, filed on Jul. 10, 2018, and titled "Synthetic Image Generation from 3D-Point Cloud" which are incorporated herein by reference in their entireties.

GOVERNMENT RIGHTS

This invention was made with Government support under government contract 11-C-0819. The Government has certain rights in this invention.

TECHNICAL FIELD

Embodiments discussed herein regard devices, systems, and methods for image registration to a three-dimensional (3D) point set. Embodiments can be agnostic to image type.

DETAILED DESCRIPTION

Various embodiments described herein register a two-dimensional (2D) image to a three-dimensional (3D) point set. The image can be from an image sensor. The image sensor can include a synthetic aperture radar (SAR), electro-optical (EO), multi-spectral imagery (MSI), panchromatic, infrared (IR), nighttime EO, visible, nighttime visible, or other image sensor. Applications of accurate registration to a 31) source include cross-sensor fusion, change detection, 3D context generation, geo-positioning improvement, target locating, target identification, or the like. In an example, the registration includes forming a "synthetic image" by projecting the 3D point set to an image space of the image being registered and populating the pixel intensities with the image intensity attribute for each point contained in the point set. An edge-based, two-step registration technique, coarse registration followed by fine registration, may be used to extract a set of tie points (TPs) (that can be converted to control points (CPs)) for a set of image tiles. The CPs, which are derived from the 3D point set and the TPs, can be used in a geometric bundle adjustment to bring the 2D image into alignment with the 3D source.

Figure 1:
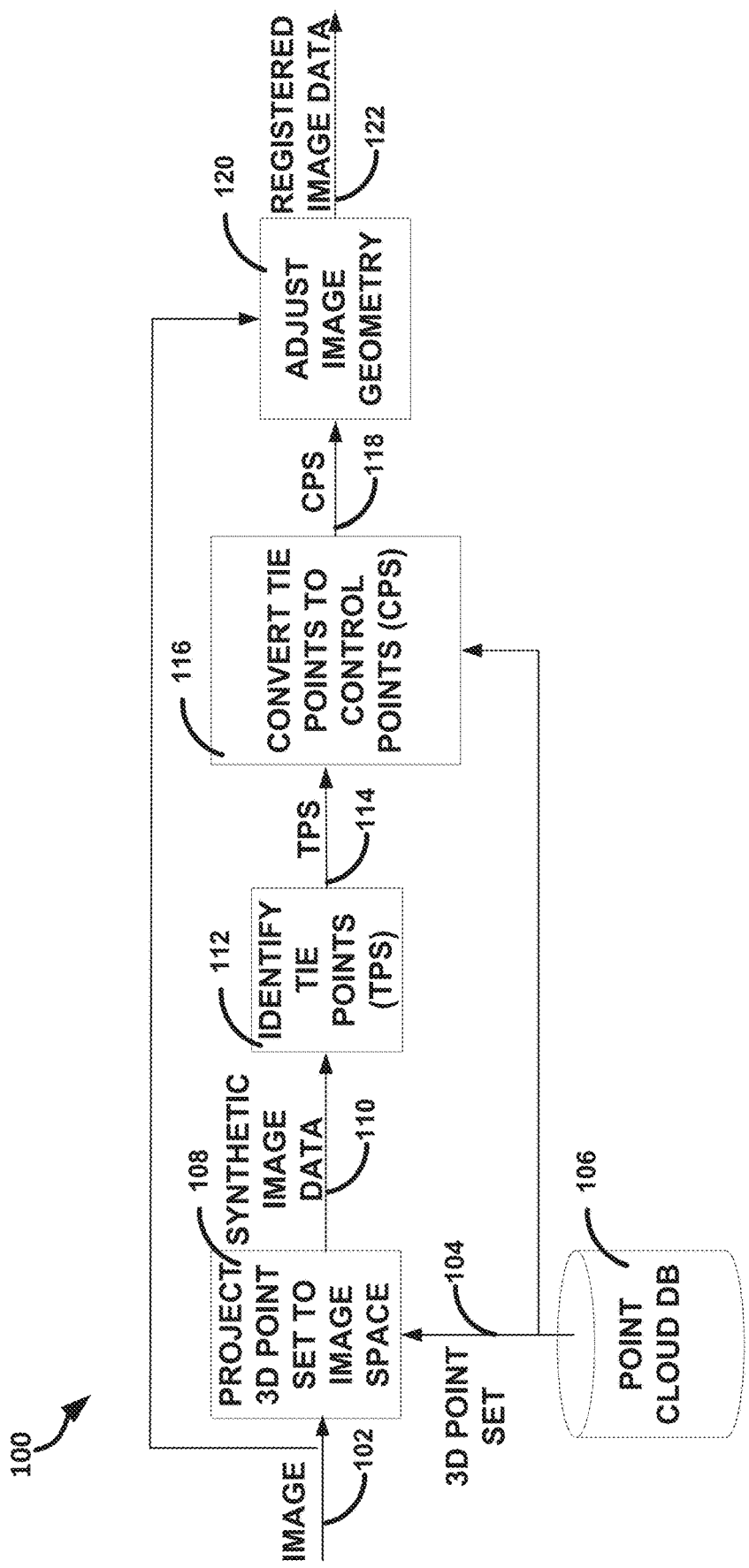
FIG. 1 illustrates, by way of example, a flow diagram of an embodiment of a method for 2D image registration to a 3D point set.

FIG. 1 illustrates, by way of example, a flow diagram of an embodiment of a method 100 for 2D image registration to a 3D point set. The method 100 includes receiving image 102 and a 3D point set 104. The image 102 can be from a SAR, EO, panchromatic, IR, MSI, nighttime EO, visible, nighttime visible, or another image sensor. The image sensor may be satellite based, located on a manned or unmanned aerial vehicle, mounted on a moveable or fixed platform, or otherwise positioned in a suitable manner to capture the image 102 of a region of interest. The 3D point set 104 can be from a point cloud database (DB) 106. The 3D point set 104 can be of a geographical region that overlaps with a geographical region depicted in the image 102. In some embodiments, the 3D point set 104 can be of a geographical region that includes the entire geographical region depicted in the image 102. In some embodiments, the 3D point set 104 can cover a larger geographical region than the geographical region depicted in the image 102.

The image registration can occur in an overlap between the 3D point set 104 and the image 102. The 3D point set data in the overlap (plus an uncertainty region) can be provided as input to operation 108. The overlap can be determined by identifying the minimum (min) and maximum (max) X and Y of the extent of the 3D point set intersected with the min and max X and Y of the image 102, where X and Y are the values on the axes of a geometric coordinate system of the image 102.

The operation 108 can include establishing a scale of the synthetic image data 110 and its geographical extent. The scale can be computed as a point spacing of the 3D point set 104 or as a poorer of the point spacing of the 3D point set 104 and the X and Y scale of the image 102. The geographical extent of the synthetic image data 110 can be determined by generating an X,Y convex hull of the 3D point set 104 and intersecting it with a polygon defined by X,Y coordinates of the extremes of the image 102. The minimum bounding rectangle of this overlap region can define an output space for the synthetic image data 110.

At operation 108, the 3D point set 104 can be projected to an image space of the image 102 to generate a synthetic image data 110. The image space of the image 102 can be specified in metadata associated with image data of the image 102. The image space can be the geometry of the image, such as a look angle, focal length, orientation, the parameters of a perspective transform, the parameters and coefficients of a rational polynomial projection (e.g., XYZ-to-image and/or image-to-XYZ), or the like. The operation 108 can include altering a geometry of synthetic image 110 derived from the 3D point set 104 to match the geometry of the image 102. As there is error in the geometry of the image 102 and in changing the geometry of the synthetic image 110 derived from the 3D point set 104, the synthetic image data 110 may not be sufficiently registered to the image 102 for some applications.

If more than one point from the 3D point set 104 projects to a same pixel of the synthetic image data 110, the point from the 3D point set that is closest to the sensor position can be used. This assures that only points visible in the collection geometry of the image 102 are used in the synthetic image data 110. Points that project outside the computed geographic overlap (plus some uncertainty region) can be discarded.

Each point in the 3D point set 104 can include an X, Y, Z coordinate, elevation, and color value (e.g., a grayscale intensity, red, green, blue intensity, or the like). In some embodiments a median of the intensities of the pixels that the point represents in all the images used to generate the 3D point set 104 can be used as the color value.

A geometry of an image can be determined based on a location, orientation, focal length of the camera, the parameters of a perspective transform, the parameters and coefficients of a rational polynomial projection (e.g., image-to-XYZ or XYZ-to-image projection or the like), and/or other metadata associated with the imaging operation in the image 102.

The initial synthetic image data 110 may have many pixels that were not filled (called void pixels). Void pixels are created when no point in the 3D point set 104 projected to that pixel of the synthetic image data 110. To fill in the void pixels, an interpolation method can be used that first looks for opposite neighbors in a neighborhood of the pixel (pixels contiguous with the pixel or less than a specified number of pixels away from the pixel). An average value (e.g., a mean, median, mode, or other average value) of all such pixels can be used for an intensity value for the uninitialized pixel. If no opposite neighbors exist, the intensity can be set to a mean intensity of all neighbors. If the neighborhood contains no initialized pixels, then a mean intensity of an outer ring or other pixels of a larger neighborhood can be used as the intensity value for the pixel. If the larger neighborhood (e.g., a 5×5 with the pixel at the center) is empty, then the pixel intensity can be set to 0 to indicate it is a void pixel. The interpolation process can be run iteratively to fill in additional void pixels. Void pixels may remain after the interpolation process, but the registration process and further applications are designed to handle such voids.

At operation 112, tie points (TPS) 114 can be identified in the synthetic image data 110. A TP is a four-tuple (row from synthetic image data 110, column from synthetic image data 110, row of the image 102, column of the image 102) that indicates a row and column of the image 102 (row, column) that maps to a corresponding row and column of the synthetic image data 110 (row, column).

The operation 112 can include operating an edge-based technique on an image tile to generate an edge pixel template for the synthetic image data 110 to be correlated with the gradient of image 102. An edge pixel template can include a gradient magnitude and phase direction for each edge pixel in an image tile. The edge pixel template can include only high contrast edges (not in or adjacent to a void in the synthetic image data 110). Alternatives to edge-based correlation techniques include fast Fourier transform (FFT), or normalized cross correlation (NCC), among others.

In some embodiments, the operation 112 can include a two-step process, coarse registration followed by fine registration. The coarse registration can operate on image tiles (subsets of contiguous pixels of the synthetic image data 110). When the synthetic image data 110 is formed it may be quite misaligned with the image 102 due to inaccuracy in the geometric metadata associated with the image 102. A registration search uncertainty can be set large enough to ensure that the synthetic image data 110 can be registered with the image 102. The term coarse registration offset means a registration offset that grossly aligns the synthetic image data 110 with the image 102. To make the registration efficient and robust an initial registration can determine the coarse registration offset and remove the same. The fine registration can then operate within a smaller uncertainty region. The coarse registration can employ a larger uncertainty search region to remove a misalignment error, or misregistration, between the synthetic image data 110 and the image 102. Fine registration can use a smaller image tile size (and image template size) and a smaller search region to identify a set of TPS 114. The TPS 114 can be converted to CPs at operation 116. The fine registration can be performed after correcting alignment or registration using the coarse registration.

In both registration steps, the same technique may be used to independently register each image tile. The fine registration can use a smaller tile size and a smaller search region. The operation 112 can include identifying pixels of the synthetic image data 110 corresponding to high contrast edge pixels. Identifying pixels of the synthetic image data 110 corresponding to high contrast edge pixels can include using a Sobel, Roberts, Prewitt, Laplacian, or other operator. The Sobel operator (sometimes called the Sobel-Feldman operator) is a discrete differentiation operator that computes an approximation of the gradient of an intensity image. The Sobel operator returns a gradient vector (or a norm thereof) that can be converted to a magnitude and a phase. The Roberts operator is a discrete differentiation operator that computes a sum of the squares of the differences between diagonally adjacent pixels. The Prewitt operator is similar to the Sobel operator. The operation 112 can include correlating phase and magnitude of the identified high contrast edge pixels, as a rigid group, with phase and magnitude of pixels of the image 102.

To ensure that not all the edge pixels in the tile are running in the same direction (have gradients with same phase), the operation 112 can include computing two thresholds on the gradient magnitude, one for pixels whose gradient phase is near a principal phase direction and one for pixels not in the principal phase direction. The threshold for edges not in the principal phase direction can be lower than the threshold for edges in the principal phase direction. Edge correlation of the operation 112 can include summing over all the high contrast edge pixels of the gradient magnitude of the image times the gradient phase match between the synthetic image data 110 and the image 102.

Edge pixels associated with voids in the synthetic image data 110 can be suppressed and not used in the correlation with the image 102. The image 102 has no voids so the gradients of all pixels of the image 102 can be used.

One aspect of the method 100 is how the TPS 114 from coarse or fine registration are used to determine an offset for each tile between the synthetic image data 110 and the image 102. A synthetic image edge pixel template can be correlated as a rigid group (without rotation or scaling, only translation) with a gradient magnitude and phase of the image 102. A registration score at each possible translation offset can be a sum over all template pixels of an image gradient times a phase match. While the method 100 is tolerant to blunders in the correlation of individual tiles, an offset from the coarse registration must be calculated correctly, or there is a risk of not being able to perform fine registration. Since the fine registration can use a smaller search radius, an error in the offset may cause the correct correlation location to be outside the search radius of the fine registration, therefore causing fine registration to be unable to correlate correctly. The blunder metrics, offset checking, and further details of the operations 112, 116 are discussed elsewhere herein.

At operation 116, the TPS 114 are converted to CPS 118 using the 3D point set 104 from which the synthetic image data 110 was produced. The CPS 118 are five-tuples (row of the image 102, column of the image 102, X, Y, and Z) if the image 102 is being registered to the 3D point set 104 (via the synthetic image data 110). The CPS 118 can include an elevation corresponding to a top of a building. A CP 118 corresponds to a point in a scene. The registration provides knowledge of the proper point in the 3D point set 104 by identifying the point that corresponds to the location to which the pixel of the synthetic image 110 is registered.

The TPS 114 can be associated with a corresponding closest point in the 3D point set 104 to become CPS 118. The TPS 114 can be associated with an error covariance matrix that estimates the accuracy of the registered TP 114. An index of each projected 3D point from the 3D point set 104 can be preserved when creating the synthetic image data 110 at operation 108. A nearest 3D point to the center of a tile associated with the TP 114 can be used as a coordinate for the CP 118. The error covariance can be derived from a shape of a registration score surface at a peak, one or more blunder metrics, or a combination thereof.

At operation 120, the geometry of the image 102 can be adjusted (e.g., via a least squares bundle adjustment, or the like) to bring the image 102 into geometric alignment with the synthetic image data 110. The geometric bundle adjustment can include a nonlinear, least squares adjustment to reduce (e.g., minimize) mis-alignment between the CPs 118 of the image 102 and the synthetic image data 110.

This adjusted geometry could be used for the synthetic image data 110 as well, except the synthetic image data 110 may be of poorer resolution than the image 102 and may not be at the same absolute starting row and column as the image 102. The adjusted geometry of the image 102 can be used to create a projection for the synthetic image data 110 that is consistent with the absolute offset and scale of the synthetic image data 110.

After the operation 120 converges, the geometry of the image 102 can be updated to match the registered control. As long as the errors of the TI'S 114 are uncorrelated, the adjusted geometry is more accurate than the TPS 114 themselves. A registration technique using CPS (e.g., a known XYZ location and a known image location for that location) can be used to perform operation 120. From the CPS 118, the imaging geometry of the image 102 can be updated to match the geometry of the CPS 118.

Adjusting the geometry of the image 102 (the operation 120) is now summarized. Image metadata can include an estimate of the sensor location and orientation at the time the image was collected, along with camera parameters, such as focal length. If the metadata was perfectly consistent with the 3D point set 104, then every 3D point would project exactly to the correct spot in the image 102. For example, the base of a flag pole in the 3D point set 104 would project exactly to where one sees the base of the flag pole in the image 102. But, in reality, there are inaccuracies in the metadata of the image 102. If the estimate of the camera position is off a little, or if the estimated camera orientation is not quite right, then the 3D point representing the base of the flag pole will not project exactly to the pixel of the base in the image 102. But with the adjusted geometry, the base of the flag pole will project very closely to where the base is in the image 102. The result of the registration is adjusted geometry for the image 102. Any registration process can be used that results in an adjusted geometry for the image 102 being consistent with the 3D point set 104.

Figure 2:
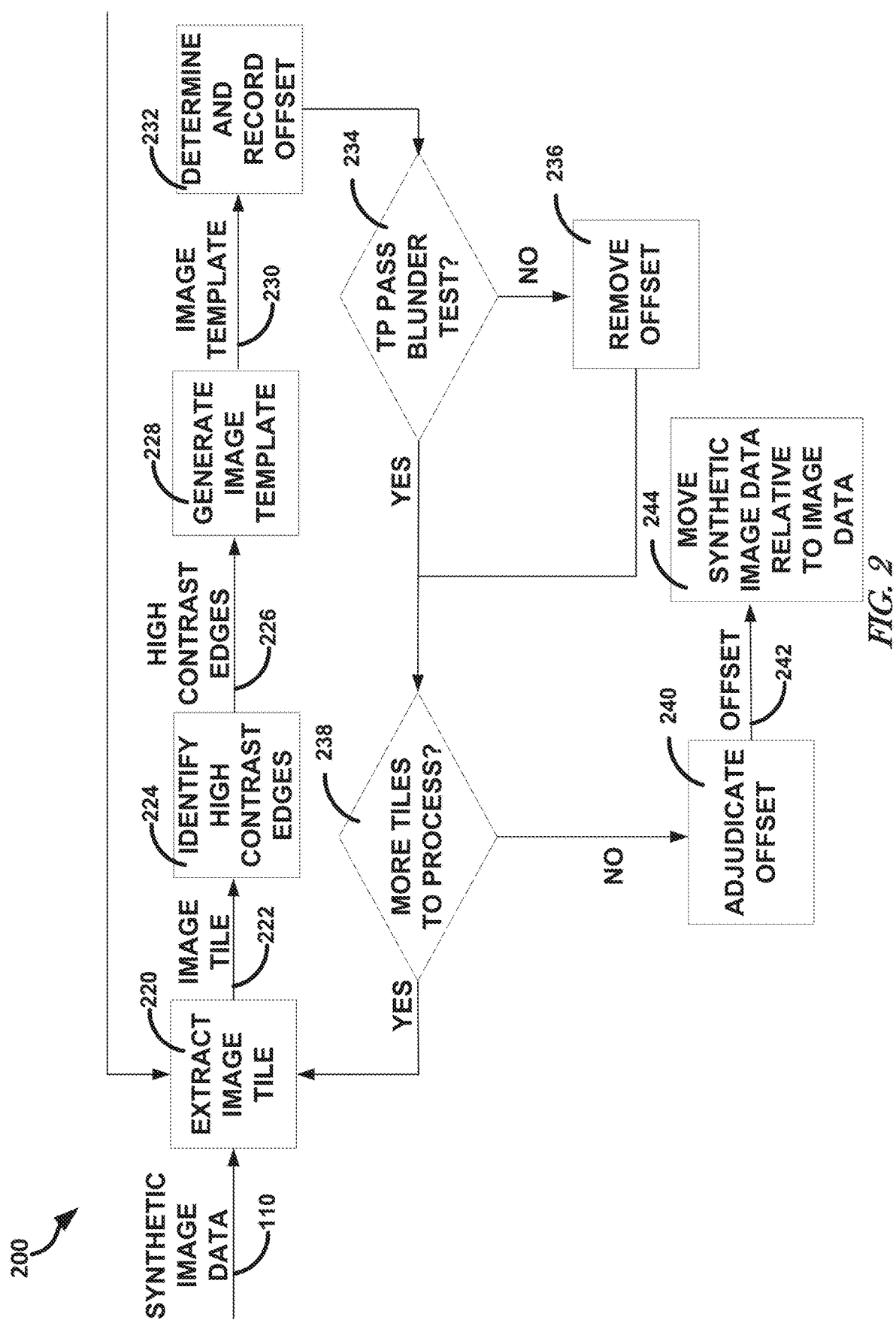
FIG. 2 illustrates, by way of example, a diagram of an embodiment of a method for registering the synthetic image data to the image.

FIG. 2 illustrates, by way of example, a diagram of an embodiment of a method 200 for registering the synthetic image data 110 to the image 102. At operation 220, an image tile 222 is extracted from the synthetic image data 110. The image tile 222 is a proper contiguous subset (less than the whole) of the synthetic image data 110 that is a specified number of rows of pixels by a specified number of columns of pixels. The number of rows and columns can be a same or different number.

At operation 224, high contrast edges 226 of the image tile 222 are identified. The operation 224 can include using a gradient magnitude histogram and a phase histogram. A desired percentage set to a first threshold (e.g., 9%, 10%, 11%, 12%, 15%, a larger or smaller percentage, or some other percentage therebetween) for template sizes less than a specified size (e.g., 16,384 pixels (e.g., 128×128 pixels, or other number of pixels) and smaller) and a second, smaller threshold for larger templates sizes (e.g., 4%, 5%, 6%, a larger or smaller percentage, or some other percentage therebetween). It can be beneficial to use high contrast edge pixels whose edge directions (phases) are not all similar to each other. If the high contrast edges pixels had the same phase, there would be reliable registrability in the direction perpendicular to the edge direction, but not along the edge. So the first step in determining which edge pixels to use in the template can include histogramming the gradient phase over all the pixels in the template image (e.g., using the gradient magnitude as the weight for each pixel when adding it to the histogram bin). Using a two-pane window each a specified number of degrees (e.g., 5, 10, 15, or other number of degrees) wide and 180 degrees apart, a sum over the histogram can be performed to find the highest window sum. The center of the pane with the highest sum can be set to be the principal phase direction. The pixels can be split into two sets, those whose phases are within ±/−45 degrees (modulo 180) of the principal phase direction and those that are not. An interval larger or smaller than +/−45 degrees can be used. A different gradient magnitude threshold can be set for each set.

It can be desired to provide about half of the total high contrast edge pixels from each of the two sets. To do this for a particular set, the gradient magnitude over all the pixels in that set can be histogrammed. The gradient magnitude threshold can be identified at which a percentage of the total of high contrast edge pixels is realized. After the two thresholds are established, all the pixels from each set that are below the threshold are removed from the template. There are at least two reasons that edge based registration provides better results than FFT or NCC. First, the synthetic image data 110 usually has a significant number of voids due to voids in the 3D point set 104. These voids are not handled effectively by FFT and NCC correlation, even when a hole-filling algorithm is performed. The second reason is the ability to register to multiple sensor types using edge-based TP identification. The sensor types can include daytime panchromatic and MSI, IR, SAR, nighttime EO, or the like. The FFT and NCC correlation methods are not effective when the synthetic image intensities are from a different sensor modality than that of the image being registered. In contrast, an edge-based correlation method is effective across sensor modalities.

At operation 228, an image template 230 can be generated. The image template 230 is the same size as the image tile and includes only those pixels corresponding to the identified high contrast edges at operation 224.

At operation 232, an offset between an initial location estimate of the image template 230 in the image 102 and a location indicated by a phase and magnitude of edges in the image 102 can be determined. The initial location estimate can be determined based on the projection of the 3D point set 104 to the image 102 in the generation of the synthetic image data 110. The X and Y of the 3D point set 104 can be adjusted based on the geometry of the image 102 to generate the location estimate.

For each pixel in the image template 230 there are at least three values: 1) its row value in the template; 2) its column value in the template; and 3) its gradient phase. As previously discussed, there is an initial estimate of where this template is in relation to the image 102 to which the image 102 is being registered. The search range is of delta row offsets and delta column offsets that the image template 230 is rigidly moved around in and compared to the gradient magnitude and phase of the image 102. At each offset, the template pixels will fall on a particular set of pixels in the registration image 102.

To compute the metric for measuring how good the correlation is at that the current offset, a computation, for each pixel in the template, of the gradient magnitude at the pixel in the image 102 corresponding to the current offset times the phase match between the gradient phase of the template pixel and the gradient phase of the image pixel. The phase match can be 90 minus the absolute difference in the two phase directions. For example, if the template phase at the pixel is 37 and the phase at the corresponding pixel in the image is 30, the absolute phase difference would be 7 and the phase match value would be 90−7=83. For cross sensor applications, the gradient can be pointing in the exact 180 degree opposite direction to the edge in the synthetic image data 110. This can be accounted for. For example, if the image 102 had a phase of 217, the absolute difference would be 187. Since the difference is greater than 90 we subtract off 180 to still get a difference of 7. The phase difference factor in the registration can be 90 minus the difference or another function of the difference. This process allows edges running in the same direction but with opposite phase to have a large phase match value. The phase match can be used to lower the weight of the contribution (in the sum) of pixels whose edge directions are very different from the template pixels. The score at each offset can be the sum over all the pixels of the template at that offset of the gradient magnitude times the phase match. The offset with the highest score can be taken to be the correct registration offset.

At operation 234, it can be determined whether a TP of the image tile 222 passes a blunder test. Several metrics (blunder metrics) may be used to assess the quality of the TPS 114 and to identify blunders (sources of error). A blunder metric (whose thresholds can be sensor dependent) can include a) a registration score, b) peak sharpness as the ratio of the score at the second highest peak to the highest score, c) an average gradient magnitude over all the edge pixels at the registered location, d) an average gradient phase match over all the template edge pixels at the registered location, e) a difference between a tile's registration offset and a median offset computed based on all TPS 114, or f) an average (e.g., a weighted average) gradient phase match. The weighted average, gradient magnitudes can be used as the weights. Another metric that may be used is the difference between a registration offset of the image tile 222 and a median offset computed from all TPS 114.

If the identified candidate TP passes the blunder test at operation 234, the TP can be added to a set of trusted TPS. If the TP does not pass the blunder test, the offset can be discarded at operation 236. This means that the image tile 222/image template 230 is not used in registering the synthetic image data 110 to the image 102. At operation 238, it can be determined if there are more tiles to process. The operation 220 can then be performed to get a next image tile 222 if there are more tiles to process. Otherwise, operation 240 can be performed.

The operation 240 can adjudicate between estimates of the correct offset. Note that for each trusted image tile, an offset is estimated, so the operation 240 attempts to determine which offset is the most correct. A least squares affine transformation can be computed from all trusted TPS. A trusted TP is one that passes the blunder metrics at operation 234. Note that a least squares calculation is sensitive to blunders. If blunders have slipped through, an affine transformation between CPs 118 can be negatively impacted. An estimate of an offset can be computed using a median (e.g., weighted median) of the individual offsets from the trusted tiles. The weight for each TP 114 can be a function of one or more blunder metrics above. Finally, a third estimate of the gross offset may be computed by combining the registration scores of all the trusted tiles at each offset into one unified total score. The offset with the maximum unified score can be another gross offset estimate. A determination of which offset is correct can be performed only in coarse registration and not in fine registration. For fine registration, each tile is registered independently and gets its own offset. All tiles that pass the blunder thresholds can be converted to CPS and used in the geometric bundle adjustment.

An adjudication to determine the correct offset, at operation 240 can include determining a median TP offset, an affine transformation computed based on the trusted TPs, and an offset associated with a top peak from a combined score surface of all TPs. To determine the trustworthiness of the offset, the maximum offset from the peak whose score is at least a specified percentage (e.g., 70%, 75%, 80%, 85%, 90%, 95%, 99%, a greater or lesser percentage, or some percentage therebetween) of a maximum correlation score may be computed. If the maximum offset is more than a specified threshold of a search radius (e.g., 25%, 50%, 75%, 80%, 85%, 90%, 95%, or a greater or lesser percentage), then the maximum combined score offset can be considered untrustworthy and discarded. If the distance is less than, or equal to, the specified threshold, the offset can be considered to pass the test and be used to determine a final offset value. If the determined offset passes the test, a median TP offset may be determined. If the median TP offset value is at least a specified percentage (e.g., 70%, 75%, 80%, 85%, 90%, 95%, 99%, a greater or lesser percentage, or some percentage therebetween) of the maximum score, then the median offset can replace the combined score offset. The offset computed from an affine transformation at the center of the image can be compared against the chosen offset. If the affine transformation produces a smaller shift, then the affine transformation offset can be selected as a correct offset 242. At operation 244, the synthetic image data 110 can be moved relative to the image 102 by the gross offset 242 prior to performing fine registration.

In some embodiments, the operation 240 can include determining whether an offset is trustworthy. The operation 240 can include determining whether the offset is less than a threshold offset. If not, the offset can be discarded. If so, the offset can be further adjudicated. An estimate of a gross offset can be computed using a median (e.g., weighted median) of the individual offsets from the trusted tiles.

To determine the trustworthiness of the gross offset of the combined registration score surface, the maximum offset distance from the peak whose score is at least 90% of a maximum correlation score may be computed. If the distance is more than a specified threshold of the search radius (e.g., 25%, 50%, 75%, 80%, 85%, 90%, 95%, or a greater or lesser percentage), then the maximum combined score offset can be considered untrustworthy. If the distance is less than, or equal to, the specified threshold, the offset can be considered to pass the test. If the distance passes the test, a median TP offset may be used. If this value is at least 95% of the maximum score, then the median offset replaces the combined score offset. The offset computed from an affine transformation at the center of the image can be compared against the chosen offset. If the affine transformation produces a smaller offset, then the affine transformation offset can be selected.

An affine transformation between the image 102 and the synthetic image data 110 can be identified or determined, such as based on the TPS 114. The affine transformation can be determined using a least squares fit to the TPS 114 between the image 102 and the synthetic image data 110. The result of the affine transformation indicates the pixel in the other image corresponding to a given pixel in a source image.

An affine transformation is a linear mapping that preserves points, straight lines, planes. That is, parallel lines in a source image remain parallel after an affine transformation to a destination image. Different affine transformations include translation, scale, shear, and rotation.

The method 200 can be performed one, two, or more times. In some embodiments, each consecutive performance of the method 200 can use a smaller image tile 222 (and corresponding search radius) that is smaller than in an immediately prior performance of the method 200.

As previously mentioned, after coarse registration results (a first pass of the method 200) are applied, a fine registration can be performed using a smaller search region. The same registration method 200 (including blunder metrics) can be applied. The TPS 114 that pass the blunder metrics can be converted to CPS 118 using the closest projected 3D point to the center of the tile. Each point in the 3D point set 104 has an intensity associated with the point. When a point (via the geometry of the image 102 we are registering to) of the 3D point set 104 is projected to a pixel in the synthetic image data 110, that point will, very likely, not project exactly to the center of a pixel. Whatever pixel of the synthetic image data 110 it projects to is associated with an intensity associated with the point. The synthetic image data 110 can retain a point identification of the point whose intensity was used to fill in the pixel. Because the 3D point set 104 may be irregularly spaced and have voids not every pixel may get filled in. Each empty pixel of the synthetic image data 110 can be provided with an intensity derived from the neighbors that are filled. If the pixel has no nearby neighbors that are filled in (which can happen for large voids in the point set), that pixel can be left empty and not used in the registration. When registering an edge template to the image 102, a center of the template is a convenient location from which to get a CP, but the center pixel may have been a pixel that did not have a 3D point that projected to it. In such cases, a pixel closest to the center that did have a point projected to it can be used for the CP. The X, Y, and Z of that point can be used as a location of the CP. The image location of CP can be shifted to be commensurate with the pixel being used in the CP. The image location can be further moved (in a subpixel fashion) to account for where inside the pixel the point actually projected. For example, the 3D point may have projected to a point a seventh of a pixel row above the center of the pixel and a quarter of a pixel column to the right of the center of the pixel. The image location can be shifted with these subpixel row and column adjustments to correspond to actual projected point.

The error covariance may be derived from the shape of the registration score surface at the peak and the quality metrics. The registration scores in a neighborhood centered at a top scoring offset location can be used to calculate the error covariance. The following method can be used. This method is described using a radius of three (3), but other radius values can be used. A radius of three (3) results in a 7×7 region centered at the location of top scoring offset. For the 7×7 region centered at the top scoring offset a minimum score can be determined. This score is subtracted off each score in the 7×7. Three sums can be determined using the 7×7. A first sum (sum1) can the sum over all the offsets in the 7×7 of the score at that offset times the square of the column difference of that offset with the center of the 7×7. As second sum (sum2) can be the score at that offset times the square of the row difference of that offset with the center of the 7×7. A third sum (sum3) can be the score at that offset times the column difference of that offset with the center of the 7×7 times the row difference of that offset with the center of the 7×7. The three sums can be divided by the sum of the scores over the 7×7 region. Let scoreSum denote the sum of the scores over the 7×7 region. These values are computed in the space of the registration image, which may not have been performed at the full resolution of the image and may need to be scaled to full resolution. Let ratioCol be the ratio of the X scale of the registration image in the column direction to the scale of the image in the column direction. Let ratioRow be the analogous ratio in the Y direction. The covariance for the CP image location is stored as an upper triangular 2×2 matrix (i.e. three values) where covar[0]=the square of ratioCol×Sum1/scoreSum, covar[1]=ratioCol×ratioRow×Sum3/scoreSum, covar[2]=the square of rowRatio*Sum2/scoreSum.

If the application of the blunder thresholds retains too few CPs, the blunder thresholds can be iteratively relaxed until a sufficient number of CPs are retained. The threshold values used to reduce blunders can be sensor dependent. In an example, if the number of TPS 114 that pass the blunder rejection are below a minimum number of TPS 114, the metrics may be relaxed, such as to achieve a specified minimum number of TPS 114.

Figure 3:
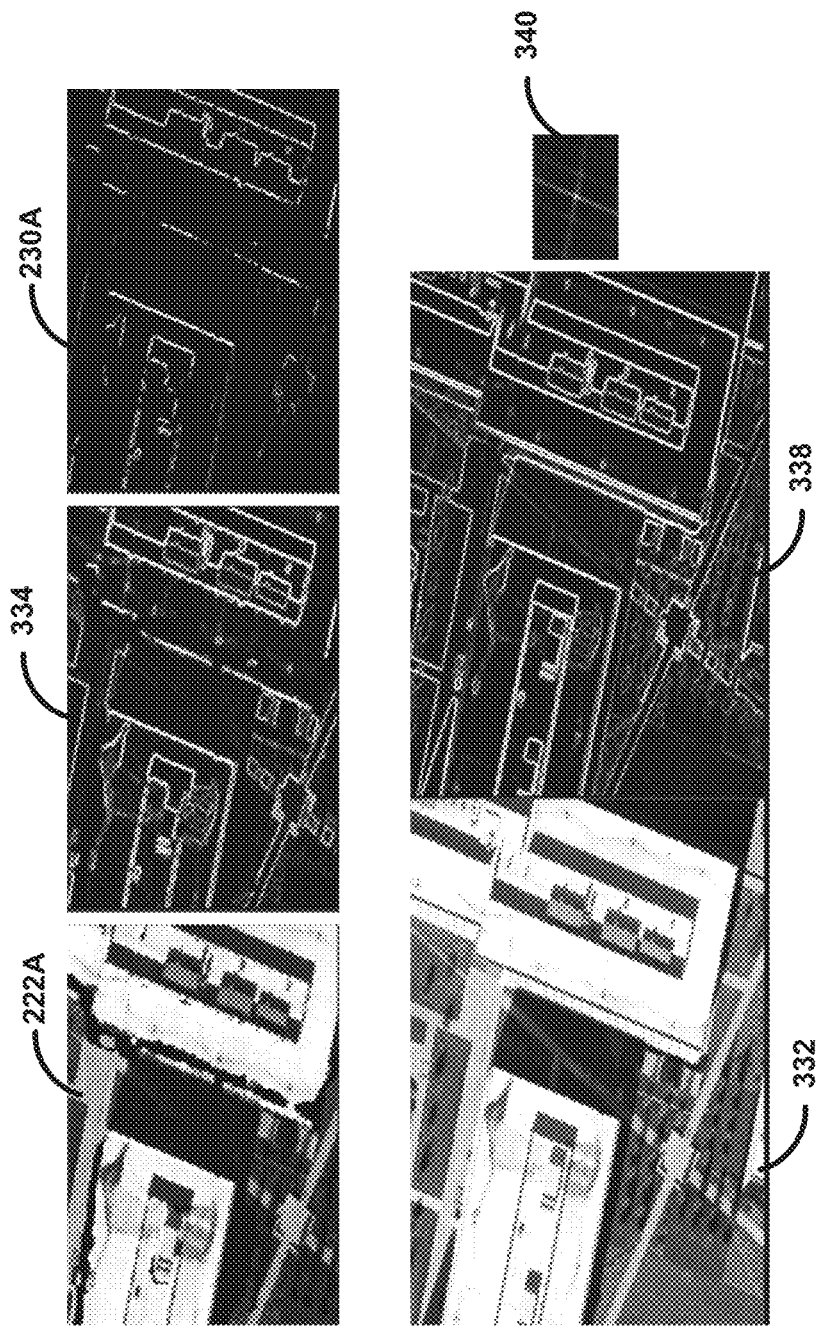
FIG. 3 illustrates, by way of example, grayscale image chips of an edge-based registration of an image tile.

FIG. 3 illustrates, by way of example, grayscale image chips of an edge-based registration of an image tile. The image chips include views of a point cloud and image of a portion of Richardson, Tex. The upper row of image chips shows the tile from a synthetic image tile 222A, a gradient magnitude from a Sobel operator in image chip 334, and high contrast edge pixels selected to use in the registration in image template 230A. The Sobel gradient operator can be used to generate gradient magnitude and phase for both the synthetic image tile 222A and an image tile 332. The image tile 332 includes a proper subset of the pixels of the image 102. The lower row of images in the figure shows the image tile 332 to which to register, its Sobel gradient magnitude in image chip 338, and a registration score resulting from correlating the high contrast synthetic image edges with the gradient from the image being registered at image chip 340. The image tile 332 is larger than the synthetic image tile 222A because it must accommodate the template size of the synthetic image tile 222A plus the registration search radius (to account for error). The correlation score 340 (at each offset) indicates that the highest correlation of the high contrast edges occurs with the center point of the synthetic image tile 222A projected to a pixel below center and right of center in the image tile 332. The process of FIG. 2 can be repeated using a tile of a smaller size and a smaller search region to get an even better correlation of the high contrast edges.

Figure 4:
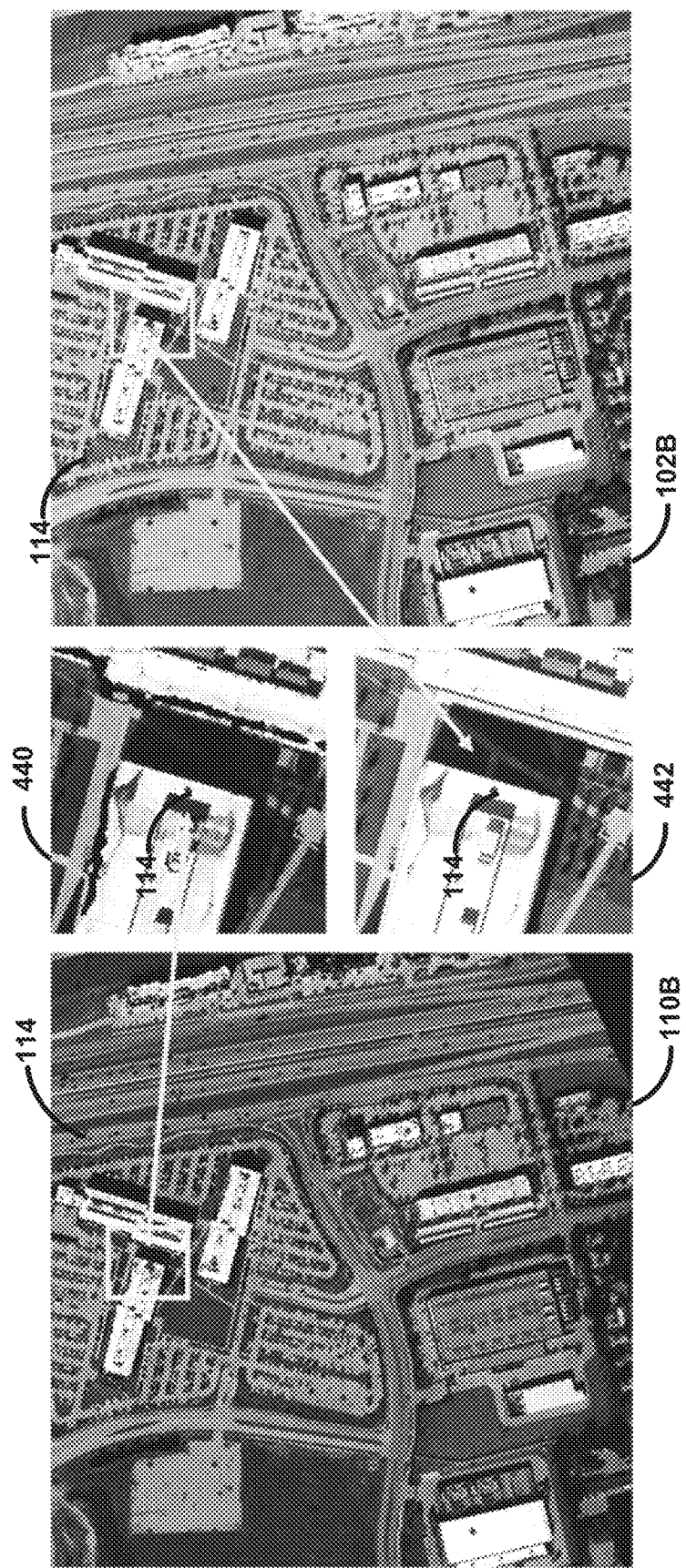
FIG. 4 illustrates, by way of example, TPS between the image and a synthetic image data.

FIG. 4 illustrates, by way of example, TPS 114 between the image 102 and a synthetic image data 110. In FIG. 4, the TPS 114 identified between a synthetic image data 110B and an image 102B for an image of a portion of Richardson, Tex. are shown. FIG. 4 illustrates a first image tile 440 from the synthetic image data 110B, a second image tile 442 from the image 102B.

Figure 5:
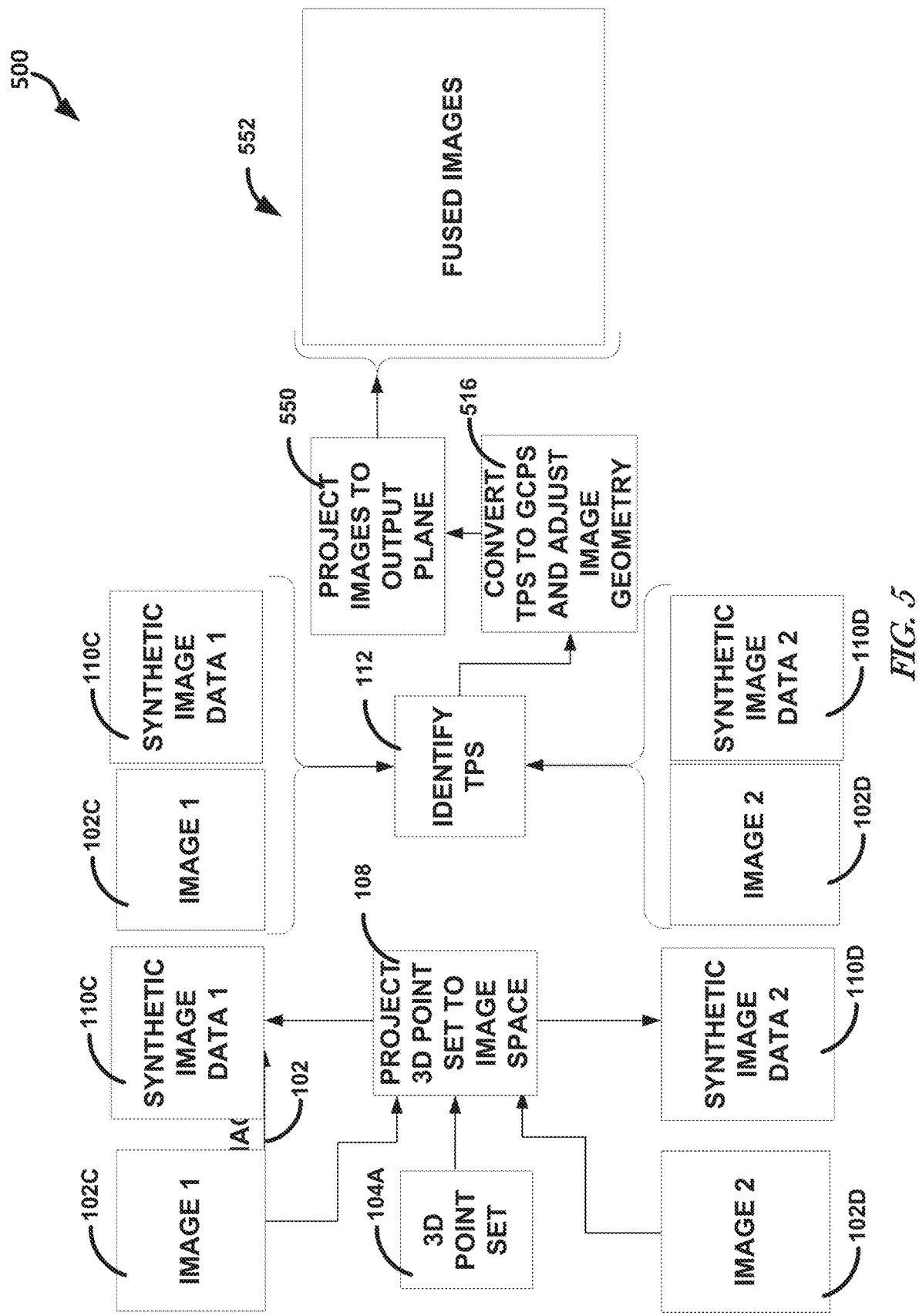
FIG. 5 illustrates, by way of example, a diagram of an embodiment of a method for image fusion using a registration process discussed herein.

FIG. 5 illustrates, by way of example, a diagram of an embodiment of a method 500 for image fusion using a registration process discussed herein. The method 500 can accurately fuse images of different sensor types. This is illustrated in FIG. 5. FIG. 5 illustrates a registration of an image 102C and another image 1021) to each other. The top row of images show a scene. The bottom row of images show the same scene rotated or otherwise generated from a different perspective. A fused image 552 is shown on the right. The illustrated fused image 552 combines portions of the registered images.

The method 500 as illustrated includes operations discussed regarding FIG. 1 and other FIGS. herein. The method 500 includes performing operation 108 to project a 3D point set 104A to the image 102C to generate synthetic image 1100 and to project the 3D point set 104A to the image 102D to generate synthetic image 110D. At operation 112, TPS 114 are identified between (a) the image 102C and the synthetic image 110C and (b) the image 102D and the synthetic image 110D. The operations 234, 236 (see FIG. 2) can be performed on the TPS 114. The operation 116 can convert the TPS 114 to CPS 118, such as by using a point in the 3D point set 104A that is closest to a respective TP 114 as the CP 118. At operation 550, the image 102C, 102D can be projected to an output plane defined by the CPS 118. The result of the image fusion is the fused image 552.

Nighttime images provide some unique challenges to image registration. To register a 3D point set and a 2D nighttime image, the direction of the registration can be reversed. Recall from a previous discussion that high contrast edges can be identified in a synthetic image 110 and correlated with a gradient of the edges in the image 102. This registration direction handles voids in the 3D point set 104 automatically. For nighttime images, the high contrast edges can be identified in the nighttime image and correlated with a gradient of the edges in the synthetic image 110. This is helpful because many of the edges in the synthetic image 110 may be from areas with no lighting in the nighttime image and therefore be non-existent or unreliable registration content. Unfortunately, when the direction of the registration is reversed, as it is in the registration of a nighttime image, voids in the synthetic image 110 are not handled automatically.

In the nighttime case, the gradients of pixels on or next to voids in the synthetic image 110 are not used. Thus, not all offsets in the registration search area will use the same number of pixels to determine a correlation score. To mitigate this inequity between offsets, the number of non-void pixels used in computing the score for each offset can be counted. Normalization may then be performed based on the count.

In some embodiments, tiles with no image content (e.g., are all black or do not have sufficient contrast) may be eliminated prior to correlation. For example, a tile in a portion of the image is all black and thus there is no contrast between pixel intensities and nothing to which to register. To identify images tiles with insufficient registrable content, statistics for an image tile can be computed on the pixel intensities and gradient magnitudes. If the intensity range or gradient percentiles are too small, the tile may not be used for registration. In an embodiment, minimum and maximum intensities along with the median and one percent intensity values (or other percent intensity values) can be calculated for each image tile. Further, $90^{th}$, $95^{th}$ and $99^{th}$ percentiles of the gradient magnitude may be calculated. The intensity values and the gradient magnitudes may be used to determine if a tile is eliminated or retained for registration.

The gradients for pixels associated with the light from a light fixture can be suppressed before template pixels (pixels used for registration) can be determined. Lights typically have edges that are further out than a corresponding light fixture. Thus, the edges associated with lights typically have no corresponding edges in the synthetic image 110. However, edges associated with the illuminated ground and objects illuminated by the lights tend to be good for registration. In some nighttime images there are edges corresponding to objects illuminated by lights that can be used for registration since there will be corresponding edges in the synthetic image 110.

To suppress the pixels corresponding to light from a light fixture, the minimum and maximum intensity in a neighborhood (e.g., a 2×2, 3×3, 4×4, or the like) of the pixel may be determined. If the maximum intensity exceeds a specified percentage value, which can be computed over the whole tile or the whole image, the pixel can be deemed to be associated with a light and a gradient magnitude of that pixel can be reduced accordingly. Or if the minimum intensity exceeds the one percent value, which may be computed over the whole file, and the maximum intensity exceeds the median value, the pixel is deemed to be associated with a light and the gradient magnitude is reduced accordingly.

Figure 6:
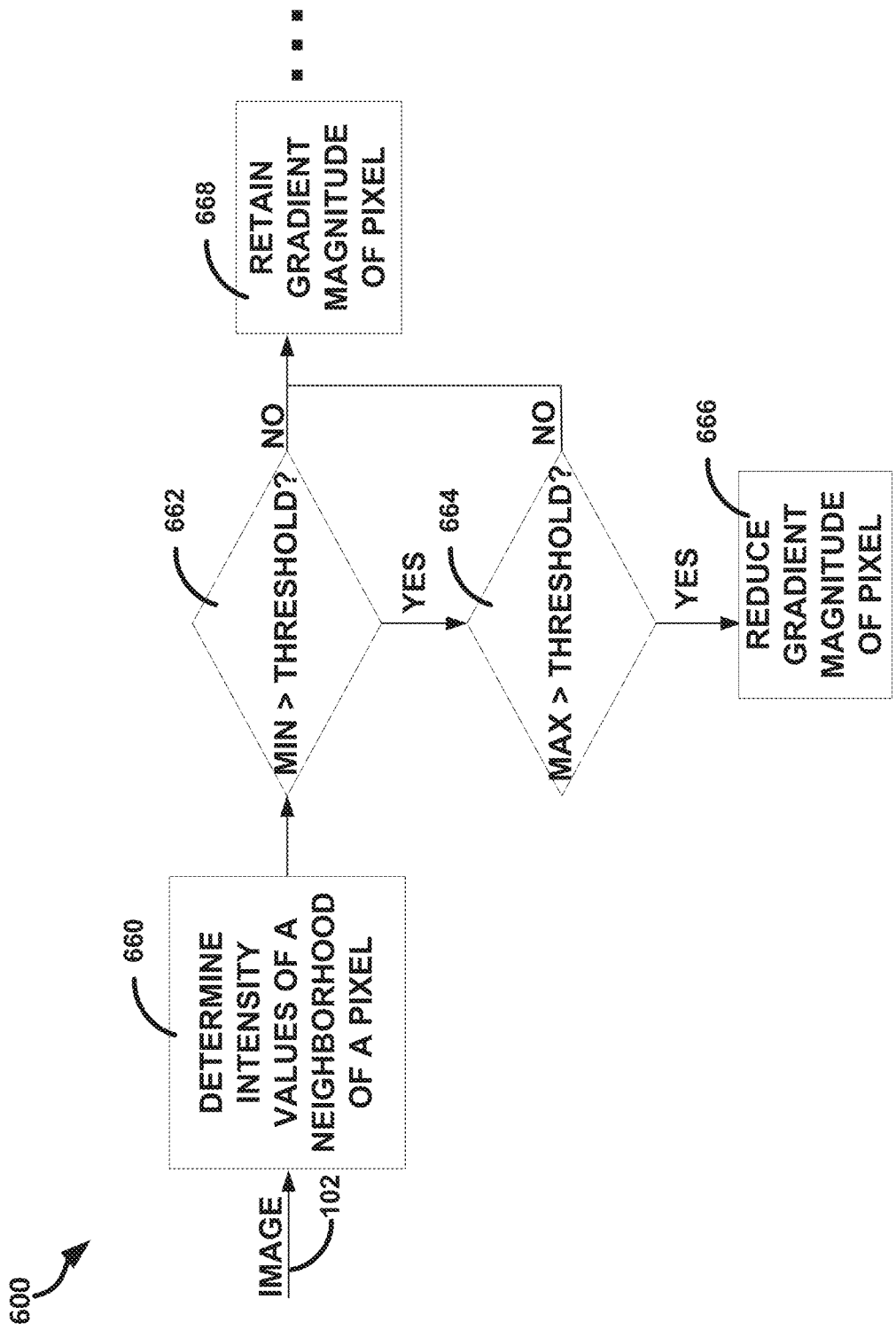
FIG. 6 illustrates, by way of example, a flow diagram of an embodiment of a method for registration of a nighttime image.

FIG. 6 illustrates, by way of example, a flow diagram of an embodiment of a method 600 for registration of a nighttime image. The method 600 can include operations same or similar to the operations of the method 100. At operation 112 (see FIG. 1), however, for nighttime images, and as previously discussed, the high contrast edges can be identified in the nighttime image and a gradient of the identified edges can be correlated with a gradient of the edges in the synthetic image 110. Further, the method 100 can include operations to account for edges present in the nighttime image that are not present in the synthetic image 110. Operations of FIG. 6 are configured to account for edges present in the nighttime image that are not present in the synthetic image 110.

At operation 660 a minimum (MIN) and maximum (MAX) intensity value in a neighborhood of a pixel (e.g., a 3×3, 5×5, or the like around the pixel with the pixel in the center of the neighborhood) can be determined. At operation 662, it can be determined if the MIN is greater than a threshold value. The threshold value can be determined based on intensity values of an image tile that includes the pixel. In some embodiments, the threshold value can be a specified percentile (e.g., $1^{st}$, $2^{nd}$, $5^{th}$, $10^{th}$, $15^{th}$, $25^{th}$, a greater percentile, or some percentile therebetween) of the image intensity values of the image tile or image or a specified percentage of a maximum intensity value of the image tile or image (e.g., 1%, 2%, 5%, 10%, 15%, 25%, a greater percentage, or some percentage therebetween).

If the MIN is less than the threshold, it can be determined if the MAX is greater than a threshold value, at operation 664. The threshold value can be a median, mode, average, a specified percentile (e.g., $40^{th}$, $50^{th}$, $75^{th}$, $90^{th}$ a greater percentile, or some percentile therebetween) of the image intensity values of the image tile or image or a specified percentage of a maximum intensity value of the image tile or image (e.g., 40%, 50%, 75%, 90%, a greater percentage, or some percentage therebetween). If the MAX is not greater than the threshold, a gradient magnitude of the pixel can be retained. If the MAX is greater than, or equal to, the threshold a magnitude of the gradient of the pixel can be reduced at operation 666. The magnitude can be reduced such that it does not contribute meaningfully to determining the offset or parameter of the image geometry.

U.S. Pat. No. 9,269,145 titled "System and Method for Automatically Registering an Image to a Three-Dimensional Point Set" and U.S. Pat. No. 9,275,267 titled System and Method for Automatic Registration of 3D Data With Electro-Optical Imagery Via Photogrammetric Bundle Adjustment" provide further details regarding image registration and geometric bundle adjustment, respectively, and are incorporated herein by reference in there entireties.

Figure 7:
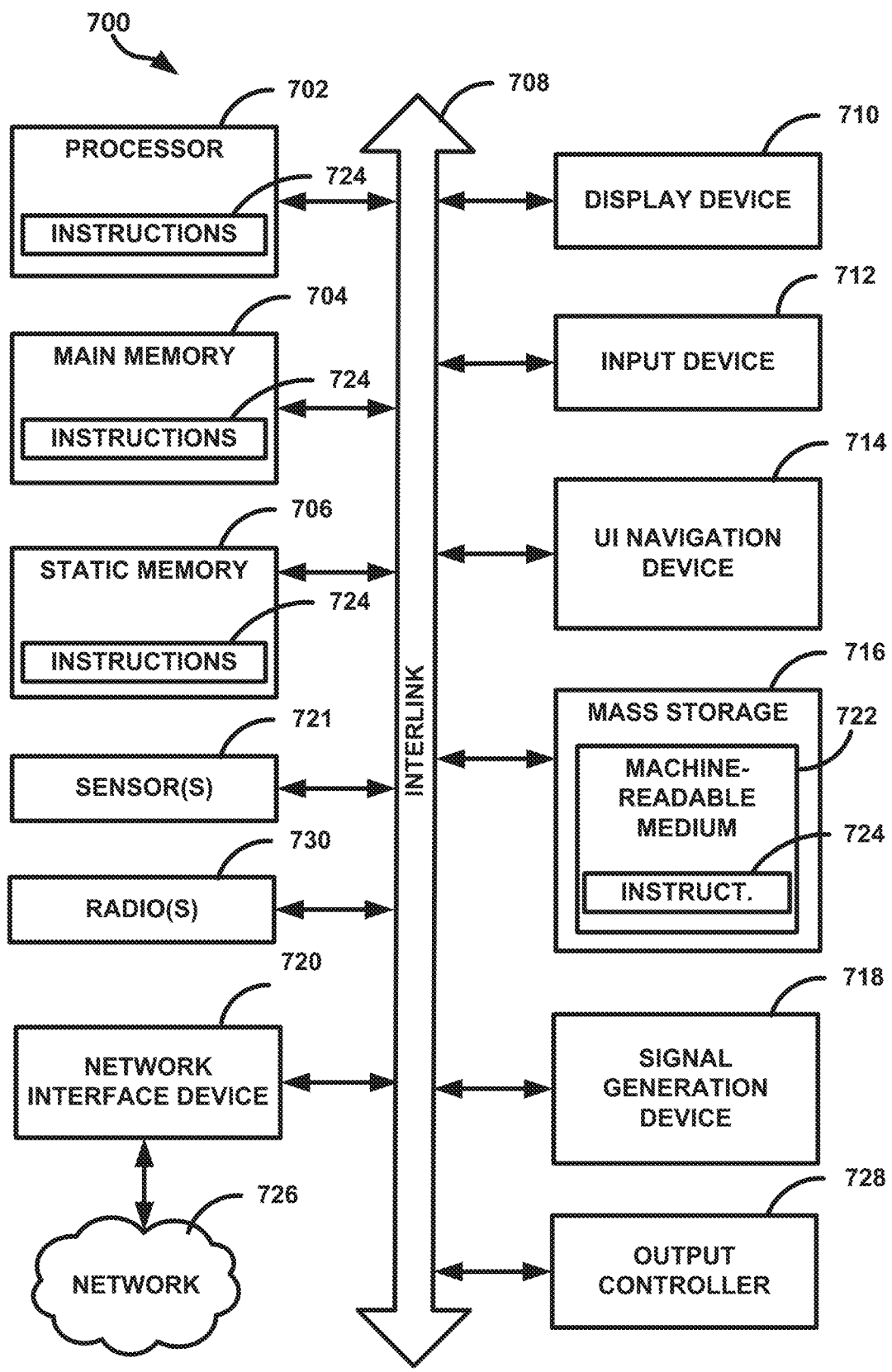
FIG. 7 illustrates, by way of example, a block diagram of an embodiment of a machine in the example form of a computer system within which instructions, for causing the machine to perform any one or more of the methods discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a mass storage unit 716, a signal generation device 718 (e.g., a speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Win and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for image registration, the method comprising:
   projecting a portion of a 3D point set to an image space of a two-dimensional image to generate a synthetic image based on a two-dimensional (2D) image of a geographical region and a location for each pixel of the synthetic image;
   performing a coarse registration to grossly register the synthetic image to the 2D image and generate a coarsely registered synthetic image, the coarse registration including:
      determining an offset of a respective synthetic image tile of the synthetic image based on a correlation score of the synthetic image tile relative to the 2D image, comparing the determined offset to an offset threshold, the offset specifying a number of pixels in row and column directions to move the synthetic image tile;

discarding the synthetic image tile if the offset is greater than the threshold and retaining the synthetic image tile if the offset is less than, or equal to, the threshold; and performing a fine registration, using retained synthetic image tiles, on the coarsely registered synthetic image following the coarse registration to improve the registration between the synthetic image and the 2D image.

2. The method of claim 1, wherein performing the coarse registration includes:

identifying edges in the synthetic image tile with a gradient greater than a specified threshold;

correlating the identified edges to corresponding edges in an image tile of the 2D image; and adjusting the location of the synthetic image tile relative to the 2D image based on the correlation to generate the coarsely registered synthetic image.

3. The method of claim 2, wherein performing the fine registration includes:

identifying edges in a second synthetic image tile of the coarsely registered synthetic image with a contrast greater than a specified contrast threshold, the second image tile including a proper subset of pixels in the first image tile;

correlating the identified edges of the second synthetic image tile to corresponding edges in a same or different image tile of the 2D image; and adjusting the location of the second image tile relative to the 2D image based on the correlation.

4. The method of claim 2, wherein identifying the edges includes computing two thresholds on a gradient magnitude, a first threshold for pixels whose gradient phase is near a principal phase direction and a second threshold for pixels not in the principal phase direction, wherein pixels with a corresponding gradient magnitude greater than a corresponding threshold of the thresholds are identified as respective edges.

5. The method of claim 4, wherein the second threshold is less than the first threshold.

6. The method of claim 1, further comprising, before adjusting the synthetic image using coarse registration:

identifying tie points between the 2D image and the synthetic image;

retaining tie points in respective synthetic image tiles that are retained based on the offset;

converting the retained tie points to control points based on a closest point in the 3D point set to a tie point of the tie points; and adjusting a geometry of the 2D image based on the control points.

7. The method of claim 6, further comprising:

vetting an identified tie point by comparing a blunder metric of the tie point to a specified threshold; and discarding the tie point if the blunder metric is below the specified threshold.

8. A non-transitory machine-readable medium including instructions that, when executed by a machine, cause a machine to perform operations for registration of a nighttime image, the operations comprising:

generating a synthetic image by projecting a three-dimensional (3D) point set of a geographical region to an image space of a nighttime two-dimensional (2D) image of the geographical region;

suppressing a gradient magnitude of a pixel of the nighttime image corresponding to a light source including determining pixel intensity values for all pixels in a neighborhood of the pixel and reducing the gradient magnitude if a minimum pixel intensity value in the neighborhood is greater than a first threshold and a maximum pixel intensity value in the neighborhood is greater than a second threshold;

after suppressing the gradient magnitude, identifying edges in the nighttime image with a corresponding gradient magnitude greater than a specified threshold;

correlating the identified edges to corresponding edges in an image tile of the synthetic image; and adjusting the location of the first image tile relative to the 2D image based on the correlation.

9. The non-transitory machine-readable medium of claim 8, wherein the first and second thresholds are different values.

10. The non-transitory machine-readable medium of claim 8, further comprising identifying an image tile with insufficient contrast and refraining from using the image tile in registration.

11. The non-transitory machine-readable medium of claim 10, wherein insufficient contrast includes a difference between a maximum intensity value of the image tile and a minimum intensity value of the image tile below a threshold.

12. A system comprising:

a memory including a three-dimensional (3D) point set of a first geographical region stored thereon;

processing circuitry coupled to the memory, the processing circuitry configured to:

generate a location for each pixel of a synthetic image by projecting a at least a portion of a three-dimensional (3D) point set of a geographical region to an image space of a two-dimensional (2D) image of the geographical region;

identify edges in a first image tile of the synthetic image with a gradient greater than a specified threshold;

correlate the identified edges to corresponding edges in an image tile of the 2D image;

coarsely registering the location of the first image tile relative to the 2D image based on the correlation to generate a coarsely registered synthetic image, the coarse registration including:

determine an offset of the respective synthetic image tile based on a correlation score of the synthetic image tile relative to the 2D image, compare the determined offset to an offset threshold, the offset specifying a number of pixels in row and column directions to move the synthetic image tile; and discard the synthetic image tile if the offset is greater than the threshold and retain the synthetic image tile if the offset is less than, or equal to, the threshold;

identify edges in a second, retained image tile of the coarsely registered synthetic image with a contrast greater than the specified threshold, the second image tile including a proper subset of pixels in the first image tile;

correlate the identified edges to corresponding edges in a same or different image tile of the 2D image; and adjust the location of the second image tile relative to the 2D image based on the correlation to generate a finely registered synthetic image.

13. The system of claim 12, wherein identifying the edges includes computing two thresholds on a gradient magnitude, one for pixels whose gradient phase is near a principal phase direction and one for pixels not in the principal phase direction, wherein pixels with a corresponding gradient magnitude greater than a corresponding threshold of the thresholds are identified as respective edges.

14. The system of claim 13, wherein the second threshold is less than the first threshold.

15. The system of claim 12, wherein the processing circuitry is further configured to, before performing coarse registration:
- identify tie points between the 2D image and the synthetic image;
- convert the tie points to control points based on a closest point in the 3D point set to a tie point of the tie points; and
- adjust a geometry of the 2D image based on the control points in retained image tiles.

16. The system of claim 15, wherein the processing circuitry is further configured to:
- vet an identified tie point by comparing a blunder metric of the tie point to a specified threshold; and
- discard the tie point if the blunder metric is below the specified threshold.

* * * * *